(12) United States Patent
Kim et al.

(10) Patent No.: US 12,508,872 B2
(45) Date of Patent: Dec. 30, 2025

(54) METHOD FOR CONTROLLING OF COOLING SYSTEM FOR HEV VEHICLE

(71) Applicants: Hyundai Motor Company, Seoul (KR); Kia Corporation, Seoul (KR)

(72) Inventors: Han Sang Kim, Ansan-si (KR); Kyung Keun Suh, Hwaseong-si (KR); Hyeong Seok Lee, Pyeongtaek-si (KR); Dae Woong Lee, Gunpo-si (KR); Sun Gyu Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 95 days.

(21) Appl. No.: 18/630,695

(22) Filed: Apr. 9, 2024

(65) Prior Publication Data
US 2025/0144973 A1 May 8, 2025

(30) Foreign Application Priority Data
Nov. 3, 2023 (KR) .................. 10-2023-0150416

(51) Int. Cl.
*B60H 1/00* (2006.01)

(52) U.S. Cl.
CPC ..... *B60H 1/00885* (2013.01); *B60H 1/00735* (2013.01)

(58) Field of Classification Search
CPC ............ B60H 1/00885; B60H 1/00735; B60H 1/00892; B60H 2001/00242; B60K 11/02; F01P 7/16; F01P 2007/146; F02D 41/1401; F02D 2200/023; F02D 2200/0414; B60Y 2200/92
See application file for complete search history.

(56) References Cited

U.S. PATENT DOCUMENTS

| | | |
|---|---|---|
| 10,815,867 B2 | 10/2020 | Kim et al. |
| 10,890,103 B2 | 1/2021 | Kim et al. |
| 10,890,104 B2 | 1/2021 | Kim |

(Continued)

FOREIGN PATENT DOCUMENTS

| | | | | |
|---|---|---|---|---|
| CN | 106322505 A | * | 1/2017 | ................ F25B 5/04 |
| DE | 112015001874 T5 | * | 2/2017 | ......... B60H 1/00642 |

(Continued)

*Primary Examiner* — Emmanuel E Duke
(74) *Attorney, Agent, or Firm* — Slater Matsil, LLP (57) ABSTRACT

A method of controlling a cooling system for a hybrid electric vehicle can include measuring an outside air temperature, determining whether the measured outside air temperature is within a preset low-temperature environment temperature range, determining, in a case where a determination is made that the outside air temperature is within the low-temperature environment temperature range, whether a vehicle state corresponds to a preset heating mode, detecting, in a case where a determination is made that the vehicle state does not correspond to the heating mode, a coolant temperature, and controlling, in a case where a determination is made that the coolant temperature detected by a coolant temperature measurement unit is within a preset target temperature range, opening and closing of a control valve by the controller to selectively perform a coolant flow stop control in a low-temperature environment.

20 Claims, 3 Drawing Sheets

(56) References Cited

U.S. PATENT DOCUMENTS

| | | | | |
|---|---|---|---|---|
| 2014/0290296 | A1* | 10/2014 | Katoh | B60H 1/32281 |
| | | | | 62/238.7 |
| 2020/0040801 | A1* | 2/2020 | Lee | F01P 7/14 |
| 2020/0040806 | A1* | 2/2020 | Kim | F02M 26/32 |
| 2022/0258570 | A1* | 8/2022 | Ishizeki | B60H 1/00385 |

FOREIGN PATENT DOCUMENTS

| | | | | |
|---|---|---|---|---|
| DE | 102018212639 A1 * | 6/2019 | | F16K 3/26 |
| DE | 102018128091 A1 * | 2/2020 | | F01P 7/165 |
| KR | 20200014539 A | 2/2020 | | |
| KR | 20200014540 A | 2/2020 | | |
| KR | 20210123601 A | 10/2021 | | |
| KR | 102496811 B1 | 2/2023 | | |

* cited by examiner

METHOD FOR CONTROLLING OF COOLING SYSTEM FOR HEV VEHICLE

CROSS-REFERENCE TO RELATED APPLICATIONS

This application claims under 35 U.S.C. § 119(a) the benefit of priority from Korean Patent Application No. 10-2023-0150416 filed on Nov. 3, 2023, the entire contents of which are incorporated herein by reference.

TECHNICAL FIELD

The present disclosure relates to a method of controlling a cooling system for a hybrid electric vehicle.

BACKGROUND

In general, an engine generates rotational force by combustion of fuel and discharges thermal energy. In this case, a coolant absorbs thermal energy while circulating through the engine, a heater, and a radiator, which discharges the absorbed thermal energy to the outside.

In a case where the temperature of the coolant of the engine is excessively high, knocking, which may result in degradation of engine performance, occurs and an ignition timing should be adjusted to suppress knocking. Further, in a case where the temperature of a lubricant is excessively high, the viscosity decreases, and thus, its lubricating function may deteriorate.

On the contrary, in a case where the temperature of the coolant of the engine is excessively low, the viscosity of oil increases, which may result in increase in friction and increase in fuel consumption. Further, the temperature of exhaust gas rises slowly, and thus, an activation time of a catalyst becomes long, and the quality of the exhaust gas deteriorates.

In addition, it may take a long time to normalize a heater function, which may cause inconvenience to a user.

In particular, because the viscosity of engine oil increases when the engine is cold-started, for example, in winter, output and efficiency of the engine are lowered, which may result in decrease in fuel efficiency.

Additionally, because the temperature of a combustion chamber is low, there is a problem of excessive emission of exhaust gas due to incomplete combustion.

Accordingly, a technique for controlling several cooling elements through a single valve, such as a technique for keeping the temperature of a coolant high in a certain part of the engine and low in other parts depending on vehicle's various modes (warm-up mode, heating mode, and cooling mode), has been proposed.

For example, a technique for independently controlling a coolant passing through a radiator, a heater core, an exhaust gas recirculation (EGR) cooler, an oil cooler, or an engine using one control valve, in particular, a technique for efficiently controlling such a control valve depending on vehicle modes has been developed (e.g., Korean Laid-open Patent Publication No. 10-2021-0123601).

The above information disclosed in this Background section is only for enhancement of understanding of the background of the disclosure, and therefore, it may also include information that does not form the prior art that is publicly known, available, or in use.

SUMMARY

The present disclosure relates to a method of controlling a cooling system for a hybrid electric vehicle (HEV), and more specifically, to a method of controlling a cooling system for the HEV, capable of improving engine warm-up of the HEV in a low-temperature environment.

Some embodiments of the present disclosure can solve the above-described problems, and some embodiments of the present disclosure can provide a method of controlling a cooling system for a hybrid electric vehicle (HEV), capable of performing, after the engine coolant for the HEV is heated to a certain temperature in a low-temperature environment, coolant flow stop control by controlling an integrated thermal management module (ITM) valve, to thereby make it possible to prevent dilution occurring in a state where the engine coolant temperature is maintained low, even in the low-temperature environment.

In an embodiment of the present disclosure, a method of controlling a cooling system for a hybrid electric vehicle includes an outside air temperature determination step of measuring an outside air temperature through an outside air temperature measurement unit and determining whether the measured outside air temperature is within a preset low-temperature environment temperature range, a vehicle state determination step of determining, in a case where a determination is made that the outside air temperature is within the low-temperature environment temperature range, whether a vehicle state detected by a vehicle state determination unit corresponds to a preset heating mode, a coolant temperature detection step of detecting, in a case where a determination is made that the vehicle state does not correspond to the heating mode by a controller, a coolant temperature through a coolant temperature measurement unit, and a flow stop controlling step of controlling, in a case where a determination is made that the coolant temperature detected by the coolant temperature measurement unit is within a preset target temperature range, opening and closing of a control valve by the controller to selectively perform coolant flow stop control in a low-temperature environment.

In an embodiment, the outside air temperature determination step may include comparing, in a case where a determination is made that the measured outside air temperature is not within the low-temperature environment temperature range, the outside air temperature with an upper limit threshold of the low-temperature environment temperature range, by the controller.

In an embodiment, the outside air temperature determination step may include selectively performing, in a case where a determination is made that the outside air temperature exceeds the upper limit threshold, the coolant flow stop control for the control valve, by the controller.

In an embodiment, the outside air temperature determination step may include suspending, in a case where a determination is made that the outside air temperature does not exceed the upper limit threshold, the coolant flow stop control for the control valve, by the controller.

In an embodiment, the vehicle state determination step may include suspending, in a case where a determination is made the vehicle state is one of a maximum heating mode, a remote start mode, and a defrost mode that belong to the heating mode by the vehicle state determination unit, the coolant flow stop control for the control valve, by the controller.

In an embodiment, the flow stop controlling step may include performing, in a case where a determination is made that the coolant temperature detected by the coolant temperature measurement unit exceeds a lower limit threshold of the target temperature range, the coolant flow stop control for the control valve, by the controller.

In an embodiment, the flow stop controlling step may include suspending, in a case where a determination is made that the coolant temperature is equal to or lower than the lower limit threshold of the target temperature range, the coolant flow stop control for the control valve, by the controller.

In an embodiment, the flow stop controlling step may include releasing, in a state where the coolant flow stop control for the control valve is performed, in a case where it is determined that the coolant temperature detected by the coolant temperature measurement unit is equal to or higher than an upper limit threshold of the target temperature range, the coolant flow stop control for the control valve, by the controller.

In an embodiment, the flow stop controlling step may include maintaining, in a case where a determination is made that the coolant temperature is lower than the upper limit threshold of the target temperature range, the coolant flow stop control for the control valve, by the controller.

In an embodiment, the method may further include a rear-seat air conditioner mounting determination step of determining whether a rear-seat air conditioner is mounted in the vehicle, prior to the determination of the outside air temperature.

In an embodiment, the rear-seat air conditioner mounting determination step may include performing, in a case where a determination is made that the rear-seat air conditioner is mounted in the vehicle, the coolant flow stop control for the control valve while selectively and partially opening a heater side of the control valve, by the controller.

In an embodiment, the rear-seat air conditioner mounting determination step may include performing, in a case where a determination is made that the rear-seat air conditioner is mounted in the vehicle, the coolant flow stop control for the control valve as the coolant temperature is within the target temperature range while adjusting a release point of the coolant flow control stop control, by the controller.

In an embodiment, the rear-seat air conditioner mounting determination step may include changing an upper limit threshold of the target temperature range for releasing the coolant flow stop control for the control valve to become relatively low, by the controller.

It can be understood that the term "vehicle" or "vehicular" or other similar terms as used herein can be inclusive of motor vehicles in general such as passenger automobiles including sport utility vehicles (SUV), buses, trucks, various commercial vehicles, tractors, watercraft including a variety of boats and ships, aircraft, and the like, and can include hybrid vehicles, electric vehicles, plug-in hybrid electric vehicles, hydrogen-powered vehicles and other alternative fuel vehicles (e.g. fuels derived from resources other than petroleum), for example. As referred to herein, a hybrid vehicle can be a vehicle that has two or more sources of power, such as both gasoline-powered and electric-powered vehicles, for example.

BRIEF DESCRIPTION OF THE DRAWINGS

The above and other features of the present disclosure will be described in detail with reference to certain example embodiments thereof illustrated the accompanying drawings which are given herein below by way of illustration only, and thus are not limitative of the present disclosure, and wherein.

It can be understood that the appended drawings are not necessarily to scale, can present a somewhat simplified representation of various features illustrative of some embodiments of the present disclosure. The specific design features for an embodiment of the present disclosure as described herein, including, for example, specific dimensions, orientations, locations, and shapes can be determined in part by the particular intended application and use environment.

In the figures, reference numbers can refer to same or equivalent parts of the present disclosure throughout the several figures of the drawing.

DETAILED DESCRIPTION OF ILLUSTRATIVE EMBODIMENTS

Hereinafter, reference will be made in detail to various embodiments of the present disclosure, examples of which are illustrated in the accompanying drawings and described below. While the present disclosure will be described in conjunction with example embodiments, it can be understood that the present description is not intended to limit the disclosure to those example embodiments. On the contrary, the present disclosure is intended to cover not only the example embodiments, but also various alternatives, modifications, equivalents, and other embodiments, which may be included within the spirit and scope of the present disclosure as defined by the appended claims.

In describing the present disclosure, in a case where related known techniques may obscure the gist of the present disclosure, detailed description thereof can be omitted.

Figure 1:
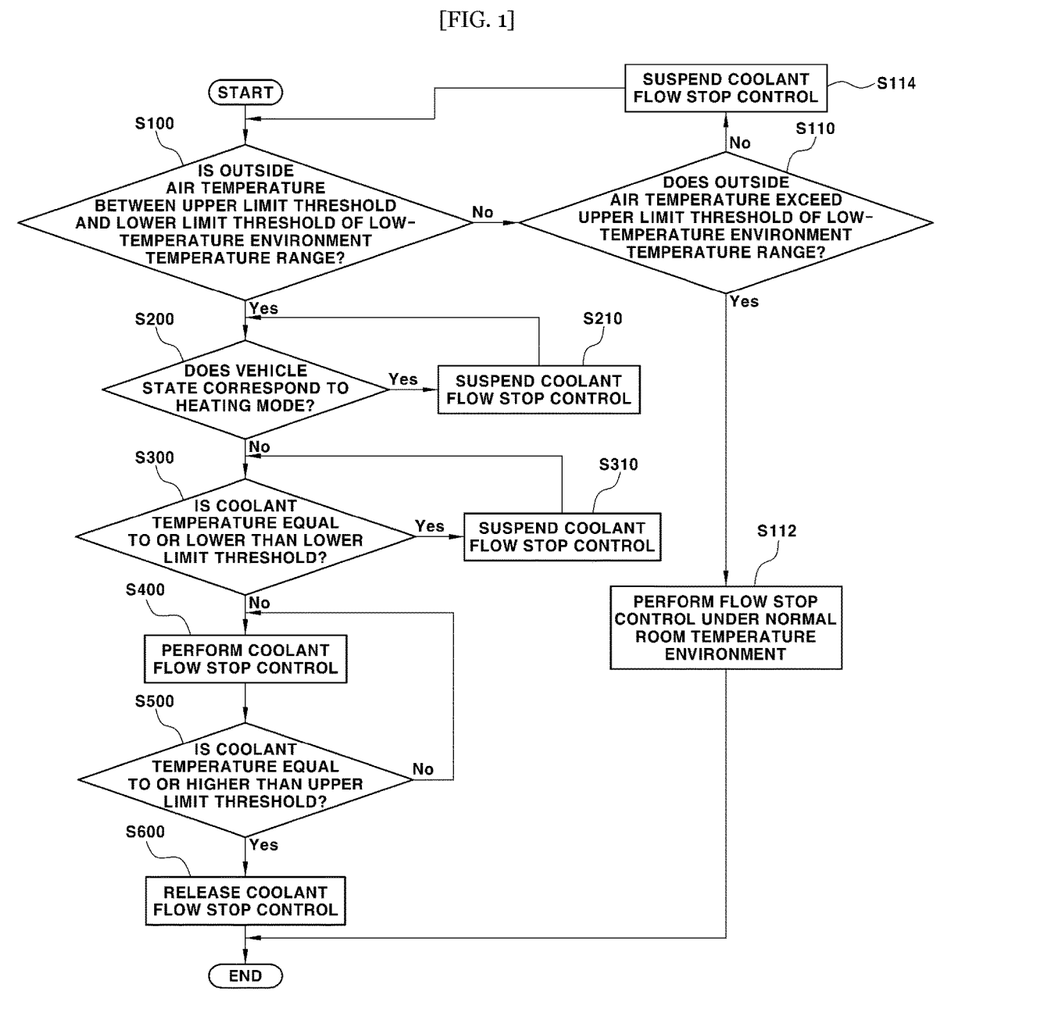
FIG. 1 is a flowchart showing a method of controlling a cooling system for an HEV according to an embodiment of the present disclosure.
Figure 2:
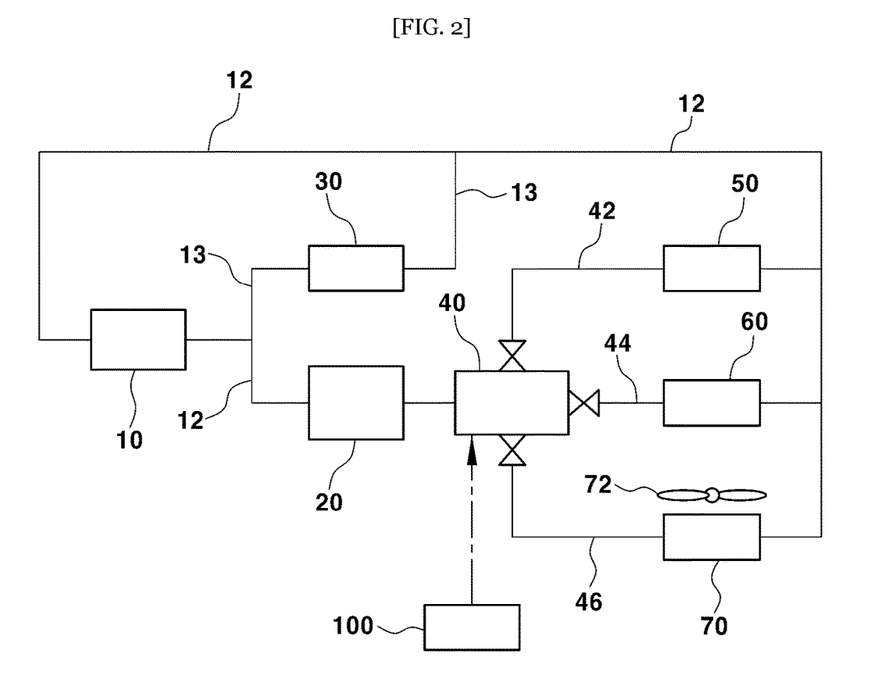
FIG. 2 is a diagram showing a configuration for implementing the method of controlling the cooling system for the HEV according to an embodiment of the present disclosure.

FIG. 1 is a flowchart diagram showing a method of controlling a cooling system for an HEV according to an embodiment of the present disclosure. FIG. 2 is a block diagram showing a configuration for implementing a method of controlling the cooling system for the HEV according to an embodiment of the present disclosure.

Figure 3:
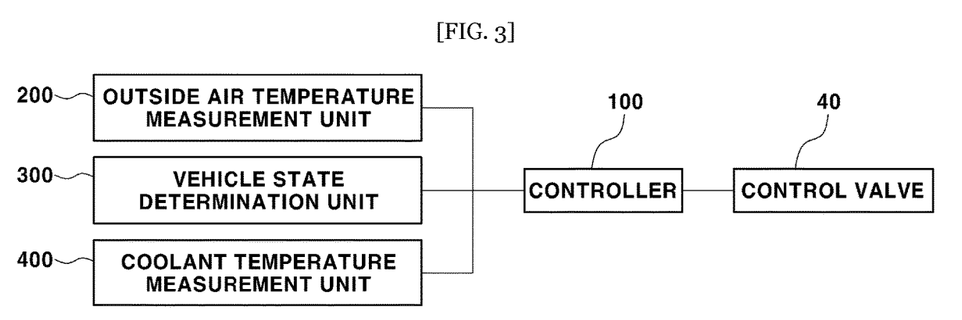
FIG. 3 is a block diagram of a cooling system for implementing the method of controlling the cooling system for the HEV according to an embodiment of the present disclosure.
Figure 4:
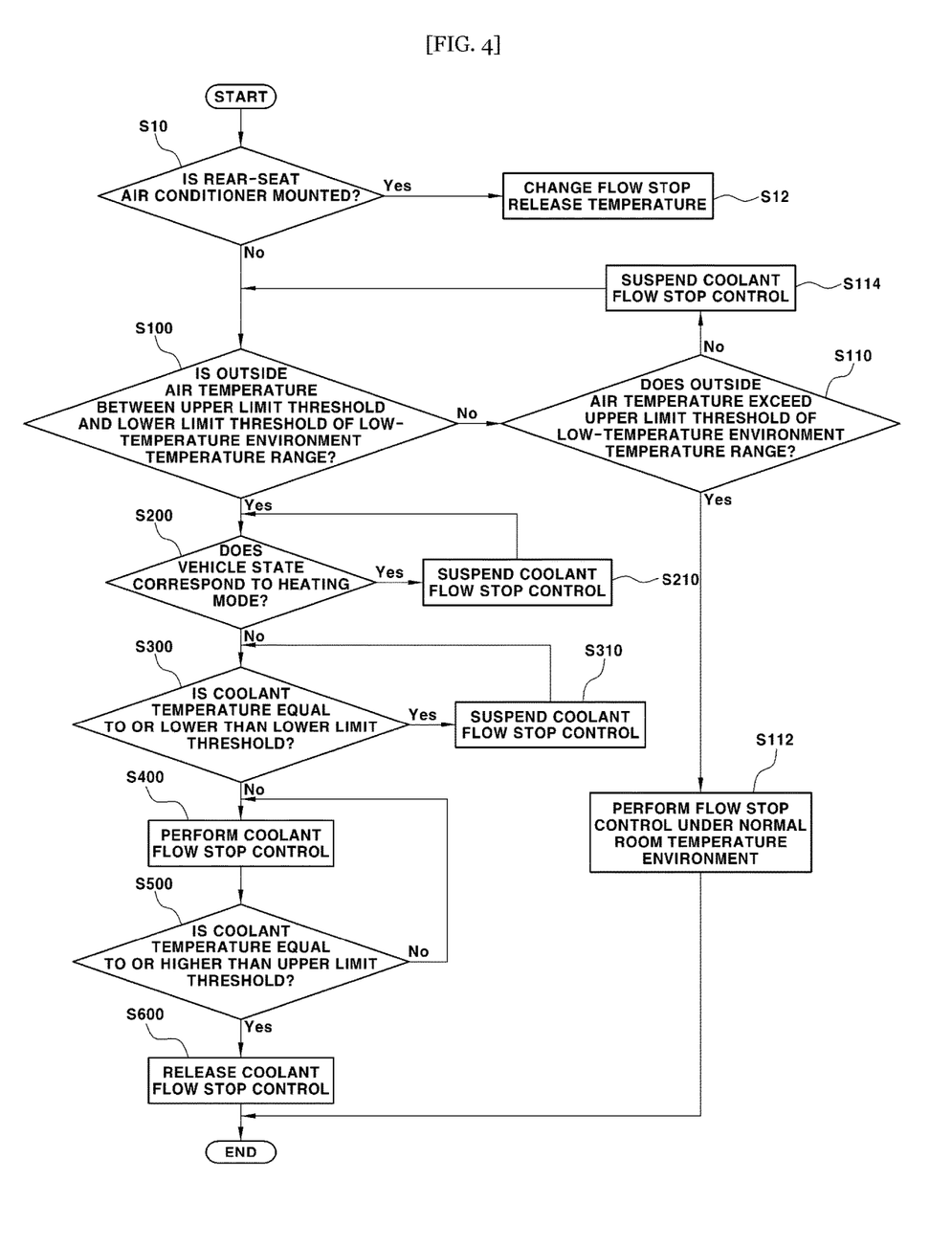
FIG. 4 is a flowchart showing a method of controlling a cooling system for an HEV according to an embodiment of the present disclosure.

FIG. 3 is a configuration diagram of a cooling system for implementing a method of controlling the cooling system for the HEV according to an embodiment of the present disclosure. FIG. 4 is a flowchart diagram showing a method of controlling a cooling system for an HEV according to an embodiment of the present disclosure.

Referring to FIG. 2, respective components of a cooling system to which a control method of a vehicle cooling system can be applied are connected to each other by a coolant line 12, and may include an engine 20, an exhaust gas recirculation (EGR) cooler 30, an oil cooler 50, a heater 60, and a radiator 70, where a coolant can be circulated through an operation of a water pump 10.

The water pump 10 can pump and distribute the coolant to the engine 20 and the EGR cooler 30 respectively through the coolant line 12.

The EGR cooler 30 may be connected to the coolant line 12 through an EGR coolant line 13 that branches from the coolant line 12 to be supplied with the coolant discharged from the water pump 10. The EGR coolant line 13 may be connected to the coolant line 12 again after passing through the EGR cooler 30.

Accordingly, the coolant discharged from the water pump 10 may be selectively supplied to the engine 20 through the coolant line 12, and may be constantly supplied to the EGR cooler 30 through the EGR coolant line 13.

The cooling system may further include a control valve 40 mounted on a coolant outlet side of the engine 20 to receive the coolant discharged from the engine 20, and more specifically, may include an integrated thermal management module (ITM) valve of a 3-way valve.

The control valve 40 may be operated according to a control signal from a controller 100, in which the controller 100 may be implemented with one or more microprocessors that operate according to a preset program, for example, and the program may include a series of commands for performing a control method according to an embodiment of the present embodiment.

The control valve 40 can be connected to the oil cooler 50, the heater 60, and the radiator 70 through first, second, and third connection lines 42, 44, and 46, respectively.

The first connection line 42 can be a line through which the coolant distributed from the control valve 40 can flow to the oil cooler 50, the second connection line 44 can be a line through which the coolant distributed from the control valve 40 can flow to the heater 60, and the third connection line 46 can be a line through which the coolant distributed from the control valve 40 can flow to the radiator 70.

The radiator 70 may be placed at a front part of the vehicle, for example, and a cooling fan 72 may be mounted at a rear part of the radiator 70.

The control valve 40 configured in this way may selectively open and close the first, second, and third connection lines 42, 44, and 46, and may control opening rates of the first, second, and third connection lines 42, 44, and 46 depending on a rotational position of a cam (not shown) provided therein.

The control valve 40 can be controlled by the controller 100 according to a driving state of the vehicle, and heating and cooling conditions of the vehicle, and can selectively supply the coolant discharged from the engine 20 to the oil cooler 50, the heater 60, and the radiator 70 to circulate the coolant, thereby adjusting the temperature of the coolant.

A general coolant flow stop control for opening and closing such a control valve 40 can be performed in a room temperature environment where the outside air temperature is 15° C. or higher, for example. In a case where the coolant flow stop control is performed in a low-temperature environment such as a sub-zero outside air temperature condition, a sudden temperature rise in an engine block and resulting thermal deformation of the engine block may occur, which may cause piston slap noise, that is, a noise problem in which a piston hits a cylinder wall due to a large cylinder-piston gap.

In performing the coolant flow stop control in such a low-temperature environment, a trouble may occur in an air conditioning control due to valve closing on the side of the heater 60.

Accordingly, to improve engine warm-up performance even in a low-temperature environment where the outside air temperature is −20° C. to +15° C., the above-mentioned problems can be prevented while performing the coolant flow stop control by opening and closing the control valve 40, for example.

Generally, dilution occurs when an engine coolant temperature is low. Under a condition where the engine coolant temperature is low, fuel injected into a combustion chamber and remaining on an inner wall of an engine block can mix with, when a piston descends, engine oil at a lower part of the engine by passing a piston ring to increase the amount of engine oil. The dilution phenomenon typically does not generally occur in internal combustion engine vehicles where the temperature of the coolant rises quickly when the engine warms up, but can occur frequently in HEVs where the engine frequently shuts off.

In low-temperature environments, the outside air temperature is inevitably kept low, and the engines of the HEVs also can frequently shut off due to their driving characteristics, such that the temperature of the coolant does not rise quickly even when the engine warms up, and thus, the dilution phenomenon can occur frequently. Accordingly, dilution of HEVs in low-temperature environments can be prevented by improving engine warm-up through controlling the opening and closing of the control valve 40 in low-temperature environments.

A method of controlling the cooling system for the HEV according to an embodiment of the present embodiment will be described as follows, with reference to FIGS. 1 and 3.

In an ON state, the temperature of outside air can be measured through an outside air temperature measurement unit 200, and it can be determined whether the measured outside air temperature is within a preset low-temperature environment temperature range (operation S100).

Specifically, it can be determined whether the measured outside air temperature is within a temperature range set by an upper limit threshold and a lower limit threshold of the preset temperature range, such as a low-temperature environment temperature range of −20° C. to 15° C. to selectively perform coolant flow stop control, for example.

In a case where it is determined that the measured outside air temperature is not within the low-temperature environment temperature range (operation S100), the outside air temperature can be compared with the upper limit threshold of the low-temperature environment temperature range, such as 15° C. for example, by the controller 100 (operation S110).

In a case where it is determined that the outside air temperature exceeds the upper limit threshold, such as 15° C. for example (operation S110), it can be determined that the vehicle is under an environment in which dilution that may occur in a state where the temperature of the engine coolant is maintained low does not occur, such as under a normal room temperature environment in which the outside air temperature is 20° C. for example, and then, the coolant flow stop control for the control valve 40, that is, the control for quickly warming-up the engine by blocking all the flow paths of the control valve 40 connected to the oil cooler 50, the heater 60, and the radiator 70 to trap the coolant in a water jacket of the engine block, can be performed by the controller 100 (operation S112).

On the other hand, in a case where it is determined that the outside air temperature does not exceed the upper limit threshold, such as 15° C. for example (operation S110), it can be determined that the outside air temperature is not included in the low-temperature environment temperature range, such as −20° C. to +15° C. for example (operation S100) and does not exceed the upper limit threshold, such as 15° C. for example (operation S110). Accordingly, because it may be assumed that the outside air temperature is less than −20° C., which is the lower limit threshold of the low-temperature environment temperature range, that is, it may be assumed to be cryogenic conditions and similar conditions, to prevent noise problems caused by the above-mentioned piston slap noise, the coolant flow stop control for the control valve 40 is not performed, that is, can be suspended, by the controller 100 (operation S114).

It can be determined whether a vehicle state detected by a vehicle state determination unit 300 corresponds to a preset heating mode (operation S200).

Because in a case where the coolant flow stop control is performed in a low-temperature environment, coolant flow stop may occur due to valve closing on the side of the heater 60, which may cause a trouble in air conditioning control, it can be determined whether the vehicle state corresponds to the heating mode (operation S200). In a case where air conditioning is necessary, the coolant flow stop control for the control valve 40 can be suspended by the controller 100 (operation S210).

The heating mode may be one of a maximum heating mode, a remote start mode, and a defrost mode in which an air conditioner is operated. In a case where it is determined by the vehicle state determination unit 300 that the air conditioning control is being performed in any one of the plurality of modes (operation S200), because the valve on the side of the heater 60 should be opened, the coolant flow stop control for entirely closing the control valve 40 can be suspended for the air conditioning control.

In a case where it is determined that the vehicle state does not correspond to the heating mode by the controller 100 (operation S200), the temperature of the engine coolant can be detected by a coolant temperature measurement unit 400.

In a case where it is determined that the engine coolant temperature detected by the coolant temperature measurement unit 400 is within a preset target temperature range, the coolant flow stop control can be selectively performed in a low-temperature environment by controlling the opening and closing of the control valve by the controller 100 (operations S300 to S500).

In a case where it is determined that the coolant temperature detected by the coolant temperature measurement unit 400 exceeds a lower limit threshold of the preset target temperature range, such as 20° C. for example (operation S300), the coolant flow stop control for the control valve 40 can be performed by the controller 100 (operation S400).

More specifically, in a case where the coolant flow stop control is performed in a low-temperature environment, a noise problem due to piston slap noise may occur, for example, due to a sudden increase in the engine block temperature, and thus, the coolant flow stop control can be not performed immediately, but can be selectively performed by the controller 100 after the coolant is heated so that the coolant temperature exceeds 20° C., for example, which can be the lower limit threshold of the target temperature range, to thereby make it possible to solve the noise problem due to the piston slap noise.

As the coolant temperature exceeds 20° C., for example, which can be the lower limit threshold of the target temperature range, as described above, in a state where the coolant flow stop control for the control valve 40 is performed, in a case where it is determined that the coolant temperature detected by the coolant temperature measurement unit 400 is equal to or higher than the upper limit threshold of the target temperature range, specifically, 60° C. for example (operation S500), the coolant flow stop control for the control valve 40 can be released by the controller 100 (operation S600), so that the coolant can be supplied toward the heater 60.

Accordingly, in an embodiment of the present embodiment, in a case where the coolant temperature is 20° C. or lower for example, that is, the coolant temperature does not correspond to the target temperature range (operation S300), the coolant flow stop control can be suspended to prevent the piston slap noise (operation S310), in a case where the coolant temperature exceeds 20° C. for example (operation S300), the coolant flow stop control for engine warm-up can be performed (operation S400), and in a case where the temperature becomes 60° C. or higher for example (operation S500), the coolant flow stop control can be released (operation S600). By selectively performing the flow stop control through controlling the opening and closing of the control valve 40, it can be possible to solve the dilution problem that can occur when the coolant temperature is maintained low.

As a result, in an embodiment of the present embodiment, after the coolant is heated to exceed 20° C. for example, the flow stop control can be performed for the control valve 40 by the controller 100, and the flow stop control can be released at the temperature of 60° C. or higher for example, thereby making it possible to prevent the piston slap noise in a low-temperature environment, and to prevent air conditioning control problems by selectively releasing the flow stop control.

As shown in FIG. 4, a method of controlling a cooling system for an HEV according to an embodiment of the present embodiment may include determining whether a rear-seat air conditioner is mounted in the vehicle (operation S10) before the outside air temperature determination step (operation S100).

In the step of determining whether the rear-seat air conditioner is mounted (operation S10), in a case where it is determined that the rear-seat air conditioner is not mounted in the vehicle, the same control as the above-described method can be performed. In a case where it is determined that the rear-seat air conditioner is mounted in the vehicle, the coolant flow stop control for the control valve 40 can be performed (operation S400) while partially opening the control valve 40 on the side of the heater 60, by the controller 100.

Accordingly, even in a case where the coolant flow stop control for the control valve 40 is performed (operation S400), because the controller 100 can perform control so that the valve on the side of the heater 60 is partially opened, for example, to have an opening rate of 15%, it can be possible to simultaneously perform the engine warm-up control and the heating operation of the heater 60 by partially opening the control valve 40 on the side of the heater 60.

In simultaneously performing the engine warm-up control and the heating operation of the heater, a control method of partially opening the valve on the side of the heater 60 may be applied, but such control method can be only for example description of one embodiment and is not necessarily limiting, and other equivalent control methods for performing the same operation may be applied.

For example, in a case where it is determined that the rear-seat air conditioner is mounted in the vehicle (operation S10), the coolant flow stop control for the control valve can be performed while adjusting a release point of the coolant flow stop control as the coolant temperature is within the target temperature range, by the controller (operation S500).

In other words, as shown in FIG. 4, by changing the upper limit threshold of the target temperature range for releasing the coolant flow stop control for the control valve 40 by the controller 100 to be relatively low from 60° C. to 45° C., that is, by changing the timing at which the coolant is supplied to the heater 60 to be relatively faster, it is possible to simultaneously perform the engine warm-up control and the heating operation of the heater by partially opening the control valve 40 (operation S12).

According to an embodiment of the present disclosure, after the engine coolant for the HEV is heated to a certain temperature in a low-temperature environment, the coolant flow stop control can be performed by controlling an integrated thermal management module valve, to thereby make it possible to prevent dilution occurring in a state where the engine coolant temperature is maintained low, even in the low-temperature environment.

In addition, according to an embodiment of the present disclosure, for a vehicle with a rear-seat air conditioner, even in a case where the coolant flow stop control is performed by controlling the integrated thermal management module valve in the low-temperature environment, because the degree of opening of the valve can be adjusted to selectively control the coolant flow toward the heater, it can be possible to simultaneously perform the engine warm-up and the heating operation of the heater according to specifications of the vehicle including the rear-seat air conditioner.

The present disclosure has been described in detail with reference to some embodiments thereof. However, it can be appreciated by those skilled in the art that changes may be made in these embodiments without departing from the principles and spirit of the disclosure, the scope of which can be defined in the appended claims and their equivalents.

What is claimed is:

1. A method of controlling a cooling system for a hybrid electric vehicle, the method comprising:
    measuring an outside air temperature through an outside air temperature measurement unit;
    determining whether the measured outside air temperature is within a preset low-temperature environment temperature range;
    in a case where the outside air temperature is within the preset low-temperature environment temperature range, determining whether a vehicle state detected by a vehicle state determination unit corresponds to a preset heating mode;
    in a case where the vehicle state does not correspond to the preset heating mode, detecting a coolant temperature through a coolant temperature measurement unit; and
    in a case where the coolant temperature detected by the coolant temperature measurement unit is within a preset target temperature range, controlling opening and closing of a control valve to selectively perform a coolant flow stop control in a low-temperature environment.

2. The method according to claim 1, further comprising, in a case where the measured outside air temperature is not within the low-temperature environment temperature range, comparing the outside air temperature with an upper limit threshold of the low-temperature environment temperature range.

3. The method according to claim 2, further comprising, in a case where the outside air temperature exceeds the upper limit threshold, selectively performing the coolant flow stop control for the control valve.

4. The method according to claim 2, further comprising, in a case where the outside air temperature does not exceed the upper limit threshold, suspending the coolant flow stop control for the control valve.

5. The method according to claim 1, wherein the vehicle state is one of a maximum heating mode, a remote start mode, and a defrost mode that belong to the preset heating mode and wherein determining whether the vehicle state detected corresponds to the preset heating mode comprises suspending the coolant flow stop control for the control valve.

6. The method according to claim 1, wherein performing flow stop control comprises, in a case where the coolant temperature detected by the coolant temperature measurement unit exceeds a lower limit threshold of the preset target temperature range, performing the coolant flow stop control for the control valve.

7. The method according to claim 6, wherein performing the coolant flow stop control comprises, in a case where the coolant temperature is equal to or lower than the lower limit threshold of the preset target temperature range, suspending the coolant flow stop control for the control valve.

8. The method according to claim 6, wherein performing the coolant flow stop control comprises, in a state where the coolant flow stop control for the control valve is performed, in a case where the coolant temperature detected by the coolant temperature measurement unit is equal to or higher than an upper limit threshold of the preset target temperature range, releasing the coolant flow stop control for the control valve.

9. The method according to claim 8, wherein performing the coolant flow stop control, in a case where the coolant temperature is lower than the upper limit threshold of the preset target temperature range, maintaining the coolant flow stop control for the control valve.

10. The method according to claim 1, further comprising determining whether a rear-seat air conditioner is mounted in the vehicle, prior to determining whether the measured outside air temperature is within the preset low-temperature environment temperature range.

11. The method according to claim 10, wherein the rear-seat air conditioner is mounted in the vehicle, the method further comprising performing the coolant flow stop control for the control valve while selectively and partially opening a heater side of the control valve.

12. The method according to claim 10, wherein the rear-seat air conditioner is mounted in the vehicle, the method further comprising performing the coolant flow stop control for the control valve as the coolant temperature is within the preset target temperature range while adjusting a release point of the coolant flow control stop control.

13. The method according to claim 12, further comprising changing an upper limit threshold of the preset target temperature range for releasing the coolant flow stop control for the control valve to become relatively low.

14. A method of controlling a cooling system for a hybrid electric vehicle, the method comprising:
    measuring an outside air temperature through an outside air temperature measurement unit;
    determining that the measured outside air temperature is within a preset low-temperature environment temperature range;
    determining that a vehicle state does not correspond to a preset heating mode;
    detecting a coolant temperature;
    determining that the coolant temperature is within a preset target temperature range; and
    controlling opening and closing of a control valve to selectively perform a coolant flow stop control in a low-temperature environment.

15. The method according to claim 14, wherein the vehicle state is a maximum heating mode, a remote start mode, or a defrost mode.

16. The method according to claim 15, wherein determining that the vehicle state detected does not correspond to the preset heating mode comprises suspending the coolant flow stop control for the control valve.

17. The method according to claim 14, wherein controlling the flow stop comprises, in a case where the coolant temperature exceeds a lower limit threshold of the preset target temperature range, performing the coolant flow stop control for the control valve.

18. The method according to claim 14, wherein the coolant temperature is lower than an upper limit threshold of the preset target temperature range and wherein the coolant flow stop is performed by maintaining the coolant flow stop control for the control valve.

19. The method according to claim 18, wherein a rear-seat air conditioner is mounted in the vehicle and wherein the coolant flow stop control is performed while selectively and partially opening a heater side of the control valve.

20. The method according to claim 18, wherein a rear-seat air conditioner is mounted in the vehicle and wherein the coolant flow stop control is performed while adjusting a release point of the coolant flow control stop control.

* * * * *